United States Patent
da Silva et al.

(10) Patent No.: US 10,893,468 B2
(45) Date of Patent: Jan. 12, 2021

(54) ACCESSING A WIRELESS COMMUNICATION NETWORK WITH REDUCED SIGNALLING OVERHEAD

(71) Applicant: Telefonaktiebolaget LM Ericsson (publ), Stockholm (SE)

(72) Inventors: Icaro L. J. da Silva, Solna (SE); Gunnar Mildh, Sollentuna (SE); Johan Rune, Lidingö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/466,133

(22) PCT Filed: Nov. 28, 2017

(86) PCT No.: PCT/SE2017/051179
§ 371 (c)(1),
(2) Date: Jun. 3, 2019

(87) PCT Pub. No.: WO2018/106166
PCT Pub. Date: Jun. 14, 2018

(65) Prior Publication Data
US 2020/0068484 A1 Feb. 27, 2020

Related U.S. Application Data

(60) Provisional application No. 62/430,037, filed on Dec. 5, 2016.

(51) Int. Cl.
*H04W 48/16* (2009.01)
*H04W 76/28* (2018.01)
(Continued)

(52) U.S. Cl.
CPC ............ *H04W 48/16* (2013.01); *H04L 5/005* (2013.01); *H04W 24/10* (2013.01);
(Continued)

(58) Field of Classification Search
CPC ...... H04W 48/16; H04W 76/28; H04W 76/27; H04W 24/10; H04W 72/046;
(Continued)

(56) References Cited

U.S. PATENT DOCUMENTS

2013/0272220 A1 10/2013 Li et al.
2014/0056246 A1 2/2014 Chun et al.
(Continued)

FOREIGN PATENT DOCUMENTS

WO 2016164077 A1 10/2016

OTHER PUBLICATIONS

Unknown, Author, "3rd Generation Partnership Project; Technical Specification Group Services and System Aspects; Study on architecture enhancements for Cellular Internet of Things (Release 13) The present", 3GPP TR 23.720 V13.0.0, Mar. 2016, pp. 1-94.

*Primary Examiner* — Afshawn M Towfighi
(74) *Attorney, Agent, or Firm* — Murphy, Bilak & Homiller, PLLC

(57) ABSTRACT

One aspect of the disclosure provides a method in a wireless terminal device for use with a telecommunications network. The wireless terminal device is operable in a plurality of states, including a first state and a second state. The second state requires less signalling overhead with the telecommunications network than the first state. The method comprises: performing measurements on one or more reference signals transmitted by a cell of the telecommunications network, or a set of one or more beams of a cell of the telecommunications network; based on the measurements, acquiring an access configuration for accessing the cell of the telecommunications network, or for accessing the set of one or more beams of a cell of the telecommunications network; while in the second state, determining the presence of data to transmit to the telecommunications network; and, responsive to
(Continued)

determining the presence of data to transmit, utilizing the acquired access configuration to transmit an access request to the cell or the set of one or more beams without performing further measurements on further reference signals from the cell or the set of one or more beams.

19 Claims, 9 Drawing Sheets

(51) Int. Cl.
  *H04W 76/27* (2018.01)
  *H04L 5/00* (2006.01)
  *H04W 24/10* (2009.01)
  *H04W 72/04* (2009.01)
  *H04W 74/08* (2009.01)

(52) U.S. Cl.
  CPC ..... *H04W 72/046* (2013.01); *H04W 74/0833* (2013.01); *H04W 76/27* (2018.02); *H04W 76/28* (2018.02)

(58) Field of Classification Search
  CPC ........... H04W 74/0833; H04W 74/006; H04L 5/005; H04B 7/088; H04B 7/0658; H04B 7/0695; H04B 7/0617
  See application file for complete search history.

(56) References Cited

U.S. PATENT DOCUMENTS

| | | |
|---|---|---|
| 2014/0198696 A1 | 7/2014 | Li et al. |
| 2015/0078189 A1* | 3/2015 | Kwon ............... H04W 52/0216 370/252 |
| 2017/0273062 A1 | 9/2017 | Liu et al. |
| 2017/0289910 A1 | 10/2017 | Islam et al. |
| 2018/0063883 A1* | 3/2018 | Nagaraja ........... H04W 52/0216 |

* cited by examiner

ACCESSING A WIRELESS COMMUNICATION NETWORK WITH REDUCED SIGNALLING OVERHEAD

TECHNICAL FIELD

Embodiments of the present disclosure relate to methods and apparatus in a wireless communication network, and particularly to methods and apparatus for accessing a wireless communication network.

BACKGROUND

Work is on-going to develop the next generation of wireless communications standards meeting the requirements set out for the fifth generation (5G) of wireless systems, as defined by the Next Generation Mobile Networks Alliance.

One of those requirements relates to the latency of transmissions between a wireless terminal device (e.g. a UE) and the network. In order to meet the wide range of use cases expected to be supported by 5G networks, latency should be reduced as far as possible. However, there are a number of anticipated scenarios in which low latency may be difficult to achieve.

For example, in order to fulfill requirements associated with network energy efficiency, it is envisioned that in at least some scenarios the standard should support the transmission of reference signals supporting idle mode operations with long periodicities between them, e.g. 40 ms and/or 100 ms. An additional benefit of long periodicity is reduced interference in the system (as there are fewer signals being transmitted) and future proofing where additional signals and/or channels can be added in the place of empty resources. However, such long periodicities create long gaps in which a wireless terminal device is unable to acquire system information or other information necessary to access the network.

According to Long Term Evolution (LTE) standards, the UE camps on a cell and uses a single cell-specific reference signal to support idle mode operation, such as performing radio resource management (RRM) measurements to decide which cell to camp on, and acquire system information to obtain the configuration of the physical random access channel (PRACH).

However, a wide range of frequencies is expected to be supported in the new standards. At very high frequencies, beamforming may be necessary to achieve adequate coverage, with different antenna architectures being supported (analog, digital and hybrid). In these scenarios, the signals supporting idle mode operation, including signals to support initial access, may also be beamformed.

In the new standards, an idle UE may be able to distinguish between different beams within a cell that the UE is camped on, e.g. via some beam identifier encoded in beam-specific reference signals and/or via some timing reference information, where the UE may be aware of the time-to-beam relationship. Further, each beam (or a group of beams, e.g. subset of the beams in the cell) within a cell may be associated with specific access configurations (e.g. information for accessing a random access channel associated with that subset of beams). This is especially important in scenarios with analog beamforming where the receiver side at the base station needs to adjust its direction so that PRACH detection is improved.

Thus the transmission of reference signals supporting idle mode operation by different beams, or groups of beams, within the cell may be separated in time (also known as beam sweeping). This may bring delay to the ability of a wireless terminal to access the network. Additionally, there may be a time gap between sweeping cycles, bringing further delay.

A solution is needed to one or more of these problems.

SUMMARY

Embodiments of the disclosure provide methods and apparatus, such as wireless terminal devices (e.g. UEs) and network nodes (e.g. eNodeBs or gNodeBs, or servers coupled to such nodes) that alleviate one of more of the problems identified above.

For example, one aspect of the disclosure provides a method in a wireless terminal device for use with a telecommunications network, the wireless terminal device being operable in a plurality of states, the plurality of states comprising a first state and a second state, wherein the second state requires less signalling overhead with the telecommunications network than the first state, the method comprising: performing measurements on one or more reference signals transmitted by a cell of the telecommunications network, or a set of one or more beams of a cell of the telecommunications network; based on the measurements, acquiring an access configuration for accessing the cell of the telecommunications network, or for accessing the set of one or more beams of a cell of the telecommunications network; while in the second state, determining the presence of data to transmit to the telecommunications network; and, responsive to determining the presence of data to transmit, utilizing the acquired access configuration to transmit an access request to the cell or the set of one or more beams without performing further measurements on further reference signals from the cell or the set of one or more beams.

Explained differently, the UE performs measurements on one or more reference signals transmitted by a cell of the telecommunications network, or a set of one or more beams of a cell of the telecommunications network and, based on those measurements, acquires an access configuration for accessing the cell of the telecommunications network, or for accessing the set of one or more beams of a cell of the telecommunications network. At a later point in time, while in the second state, the UE determines the presence of data to transmit to the telecommunications network. Upon determining the presence of that data, the UE utilizes the access configuration acquired earlier, i.e. before the data required transmission, to transmit an access request to the cell or the set of one or more beams.

In a further alternative definition, the UE performs measurements on one or more reference signals transmitted by a cell of the telecommunications network, or a set of one or more beams of a cell of the telecommunications network. At a later point in time, while in the second state, the UE determines the presence of data to transmit to the telecommunications network. Upon determining the presence of that data, based on the measurements performed earlier, i.e. before the data required transmission, the UE acquires an access configuration for accessing the cell of the telecommunications network, or for accessing the set of one or more beams of a cell of the telecommunications network, and utilizes that access configuration to transmit an access request to the cell or the set of one or more beams.

In each of the embodiments set out above, the latency for transmission of the access request is substantially reduced as measurements or access configurations acquired previously are utilized instead of new measurements or access configurations acquired after the data becomes available to transmit.

DETAILED DESCRIPTION

Figure 1:
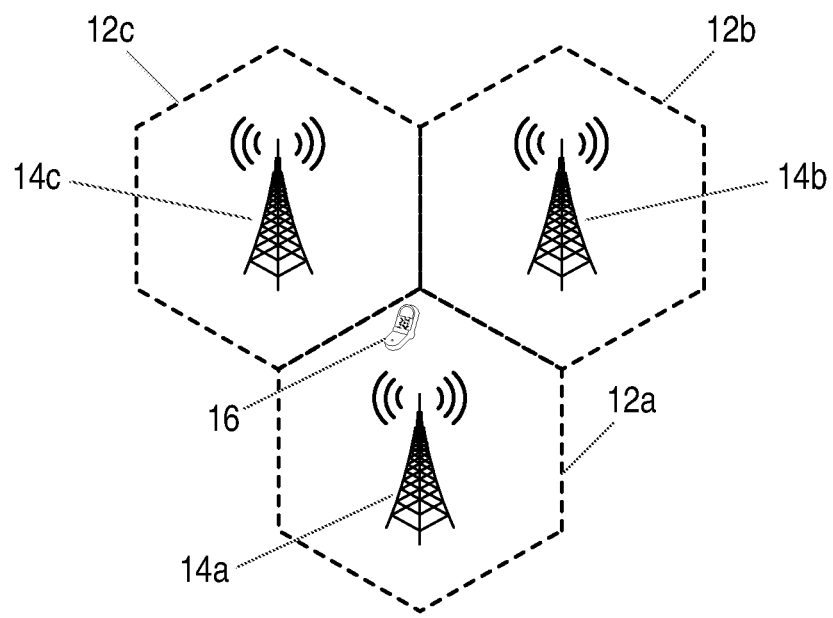
FIG. 1 shows a network according to embodiments of the disclosure.

The following sets forth specific details, such as particular embodiments for purposes of explanation and not limitation. But it will be appreciated by one skilled in the art that other embodiments may be employed apart from these specific details. In some instances, detailed descriptions of well-known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computers that are specially adapted to carry out the processing disclosed herein, based on the execution of such programs. Nodes that communicate using the air interface also have suitable radio communications circuitry. Moreover, the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors, one or more processing modules or one or more controllers, and the terms computer, processor, processing module and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

Although the description is given for user equipment (UE), it should be understood by the skilled in the art that "UE" is a non-limiting term comprising any mobile or wireless device or node equipped with a radio interface allowing for at least one of: transmitting signals in uplink (UL) and receiving and/or measuring signals in downlink (DL). A UE herein may comprise a UE (in its general sense) capable of operating or at least performing measurements in one or more frequencies, carrier frequencies, component carriers or frequency bands. It may be a "UE" operating in single- or multi-radio access technology (RAT) or multi-standard mode. As well as "UE", the terms "mobile station" ("MS"), "mobile device" and "terminal device" may be used interchangeably in the following description, and it will be appreciated that such a device does not necessarily have to be 'mobile' in the sense that it is carried by a user. Instead, the term "mobile device" encompasses any device that is capable of communicating with communication networks that operate according to one or more mobile communication standards, such as the Global System for Mobile communications, GSM, UMTS, Long-Term Evolution, LTE, IEEE 802.11 or 802.16, etc.

The description involves communication between a UE and a radio access network, which typically includes multiple radio access nodes. In the specific example given, the radio access nodes take the form of eNodeBs (eNBs), as defined by 3GPP, or gNodeBs (gNBs) as utilised in the future standards expected to meet the 5G requirements. However, it will be appreciated that the concepts described herein may involve any radio access nodes. Moreover, where the following description refers to steps taken in or by a radio access node, this also includes the possibility that some or all of the processing and/or decision making steps may be performed in a device that is physically separate from the radio antenna of the radio access node, but is logically connected thereto. Thus, where processing and/or decision making is carried out "in the cloud", the relevant processing device is considered to be part of the radio access node for these purposes.

FIG. 1 shows a wireless communication network 10 according to embodiments of the disclosure. The network 10 comprises a plurality of radio access nodes 14a, 14b, 14c, each serving one or more respective cells 12a, 12b, 12c. The network 10 may further comprise a core network (not illustrated) to which each of the radio access nodes is connected. A wireless terminal device 16 (also known as a UE) is camped on the cell 12a, and is served by the radio access node 14a.

The cellular network 10 may at least partly be based on radio access technologies such as e.g. 3GPP Long Term Evolution (LTE), LTE-Advanced, Evolved Universal Terrestrial Radio Access Network (E-UTRAN), Universal Mobile Telecommunications Service (UMTS), Global System for Mobile (GSM)/Enhanced Data rate for GSM Evolution (GSM/EDGE), Wideband Code Division Multiple Access (WCDMA), Worldwide Interoperability for Microwave Access (WiMax), or Ultra Mobile Broadband (UMB), Evolved Universal Terrestrial Radio Access (E-UTRA), Universal Terrestrial Radio Access (UTRA), GSM EDGE Radio Access Network (GERAN), 3GPP2 CDMA technologies e.g. CDMA2000 1×RTT and High Rate Packet Data (HRPD), just to mention some options. The network 10 may be suitable for providing radio communications meeting one or more of the criteria established by the Next Generation Mobile Networks Alliance for the 5th generation of mobile telecommunications standards.

The coverage provided by one or more of the radio access nodes 14 may be divided into a plurality of beams, each radiating outwards in a different direction from the radio access node. That is, a radio access node may be configured to use beamforming techniques to generate and transmit N beams (where N is an integer greater than 1), each pointing in a different direction. The different beams may be time-division multiplexed, such that the radio access node transmits one or more of the N beams in a first time period, a different one or more of the N beams in a second time period, and so on.

Each of the radio access nodes 14 may transmit periodic reference signals to support idle mode operation in the UEs camped in their respective cells 12. The periodic reference signals may comprise one or more of: synchronization signals, cell-specific reference signals, beam-specific reference signals, and system information broadcasts. Although beam-specific reference signals are not defined in current standards, for present purposes a beam-specific reference signal may be considered as analogous to a cell-specific reference signal, but for a specific beam or subset of beams within a cell. The beam-specific reference signals may comprise a beam identifier encoded within them, or be identified via some timing reference information, where the UE may be aware of the time-to-beam relationship (i.e. where each beam is transmitted at a particular time or with a particular offset from a reference time, and the UE has knowledge of the relevant timings).

The reference signals for individual beams, or subsets of beams, within a cell may be transmitted at different times by the radio access node. This transmission of reference signals is described herein as "beamsweeping". That is, the reference signals for a first subset of one of more beams in the cell are transmitted during a first time window, the reference signals for a second subset of one or more beams are transmitted during a second time window, and so on until the reference signals for all of the beams in the cell have been transmitted. The respective time windows for each subset of beams may follow each other consecutively, with the time taken to transmit all of the reference signals referred to herein as a "beamsweeping cycle". Such beamsweeping cycles may be transmitted continuously, with a second cycle immediately following conclusion of a first cycle, or be separated by a time interval in which no transmission of the reference signals takes place. Note that the term "beamsweeping" does not imply that reference signals for a first beam or subset of beams are followed by transmission of a neighbouring beam or subset of beams within the cell. In general, the reference signals for different beams or subset of beams during a beamsweeping cycle may be transmitted in any order.

Thus the radio access node transmits periodic reference signals (relating either to the entire cell or specific beams thereof) to support UEs in low-power states such as RRC idle or similar states defined below. When UE in such a low-power state determines that it has data to transmit to the radio access node (i.e. uplink data), the UE must first determine which cell or beam it is located in, as it will not know whether it has moved significantly since entering the low-power state. The UE must wait for a periodic reference signal, as defined above, before determining an appropriate access configuration for that cell or beam and accessing the network.

Figure 2:
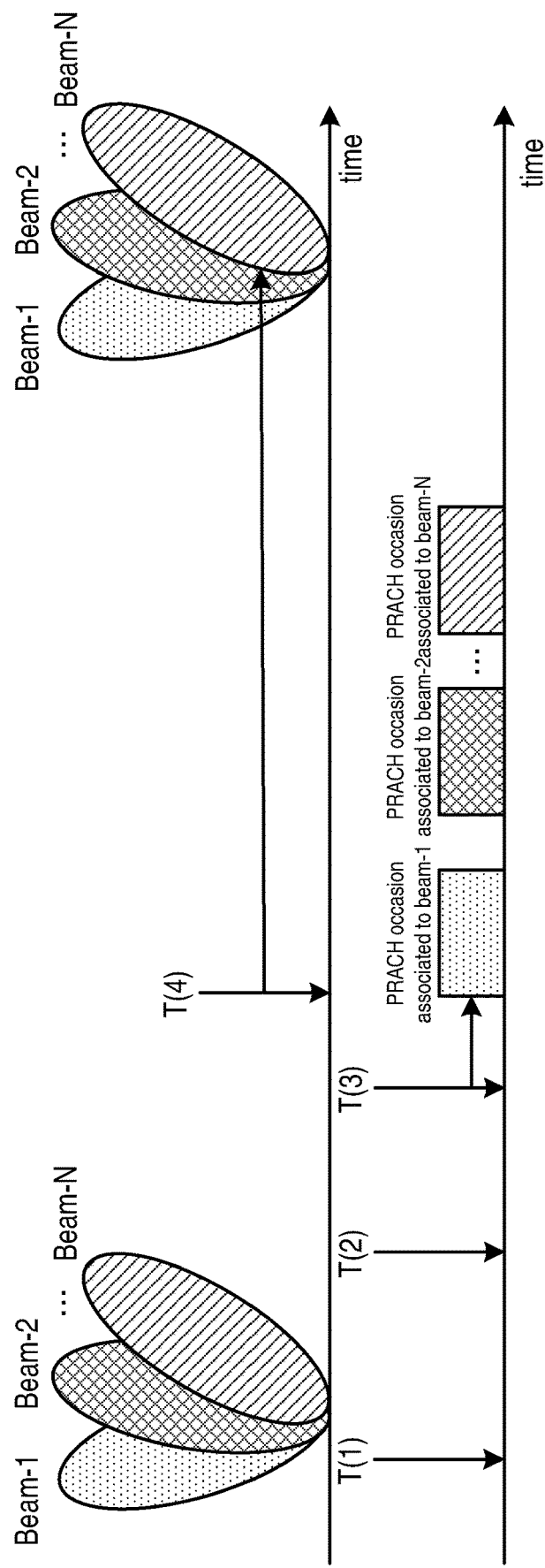
FIG. 2 shows the problem of a wireless terminal device accessing reference signals while in a low-power state.

FIG. 2 shows this problem in more detail, for the scenario in which a radio access node transmits a plurality of N beams. The upper time line shows transmissions by the radio access node, while the lower time line shows transmission opportunities associated with the UE.

In step 1, at time T(1), the radio access node begins to transmit a beamsweeping cycle, with reference signals for each of the beams associated with its cell (e.g. Beam 1 to Beam N). A reference signal may be associated with individual beams or subsets of more than one beam. In the illustrated example, we assume that each beam has its own dedicated reference signal.

The UE detects the reference signals (or at least one of those reference signals) and performs measurements to determine the beams in its neighbourhood. The UE selects the beam associated with the strongest signal (e.g. beam 1), and acquires the access configuration for at least that beam so that it may access it in future. For example, the access configuration may relate to the information necessary for accessing a random access channel associated with that channel (such as one or more of random-access transmission resources, available random-access preambles, power information, etc). The access configuration may be transmitted as part of the reference signals detected in step 1, or alternatively the UE may have been configured at an earlier time with the access configurations for multiple different beams, such that the access configuration for the beam 1 can be selected from those stored access configurations. Further, each beam may have its own respective access configuration, or access configurations may be shared between more than one beam (i.e. a subset of one or more beams).

At some later time T(2), the UE enters a low-power state such as RRC idle, or RRC inactive. The UE may also enter a discontinuous reception (DRX) cycle, in which its transceiver circuitry is powered down for extended periods, between periodic "on durations" in which the UE monitors for paging messages, etc from the network.

While in this low-power state, at time T(3), the UE determines that it has data in its buffer for transmission to the network. The UE must therefore determine an appropriate access configuration for accessing the network. However, as it has been in the low-power state, the UE is unable to determine which access configuration to use until it has received and performed measurements on reference signals from nearby beams or cells. Thus, even though it may be a relatively short wait until the PRACH occasion for beam 1 occurs at time T(4) (i.e. the physical resources for randomly accessing beam 1), the UE cannot know that beam 1 is still the strongest beam or even that beam 1 is still available. The UE may have moved out of the coverage area associated with beam 1 while in the low-power state.

The UE must instead wait until the next occurrence of a beamsweeping cycle (which may be after an additional interval), perform measurements on the reference signals received at that time, and use an access configuration based on those measurements. This may significantly increase control plane latency.

Figure 3:
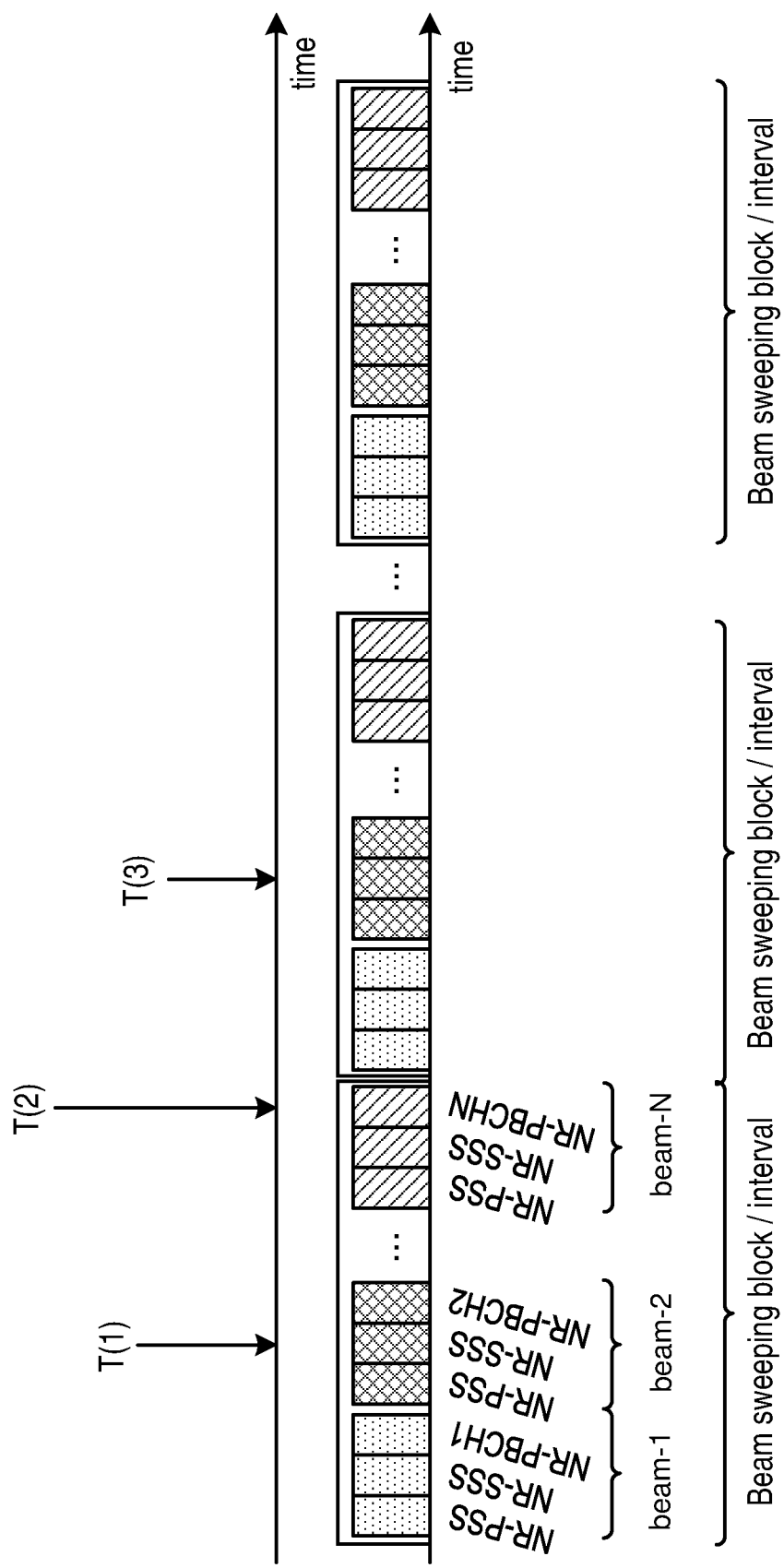
FIG. 3 shows the transmission of reference signals.

FIG. 3 shows the scenario in more detail. Transmission opportunities associated with the UE are shown in the upper line; transmissions by a radio access node are shown in the lower line. The radio access node transmits reference signals associated with beams 1 to N during a beamsweeping block, or cycle. In the illustrated example, the reference signals for each beam include synchronization signals (primary and secondary synchronization sequences) and a physical broadcast channel comprising system information. One or more of these signals/channels can be multiplexed in frequency (i.e. transmitted at the same time but using a different frequency as at least one of the other signals). Further, each beam-sweeping cycle follows the previous cycle without interval.

In this example, the UE detects the reference signals for one or more of the beams and selects the strongest beam to access the network at time T(1) (in this example that is beam 2). At a later point in time T(2), while in a low-power state, the UE may determine that it has data in its buffer to transmit to the network. However, the next transmission of reference signals by beam 2 (which the UE can use to confirm that the access configuration for beam 2 is still appropriate) may not be for some time at T(3), depending on the number of beams within the cell.

Figure 4:
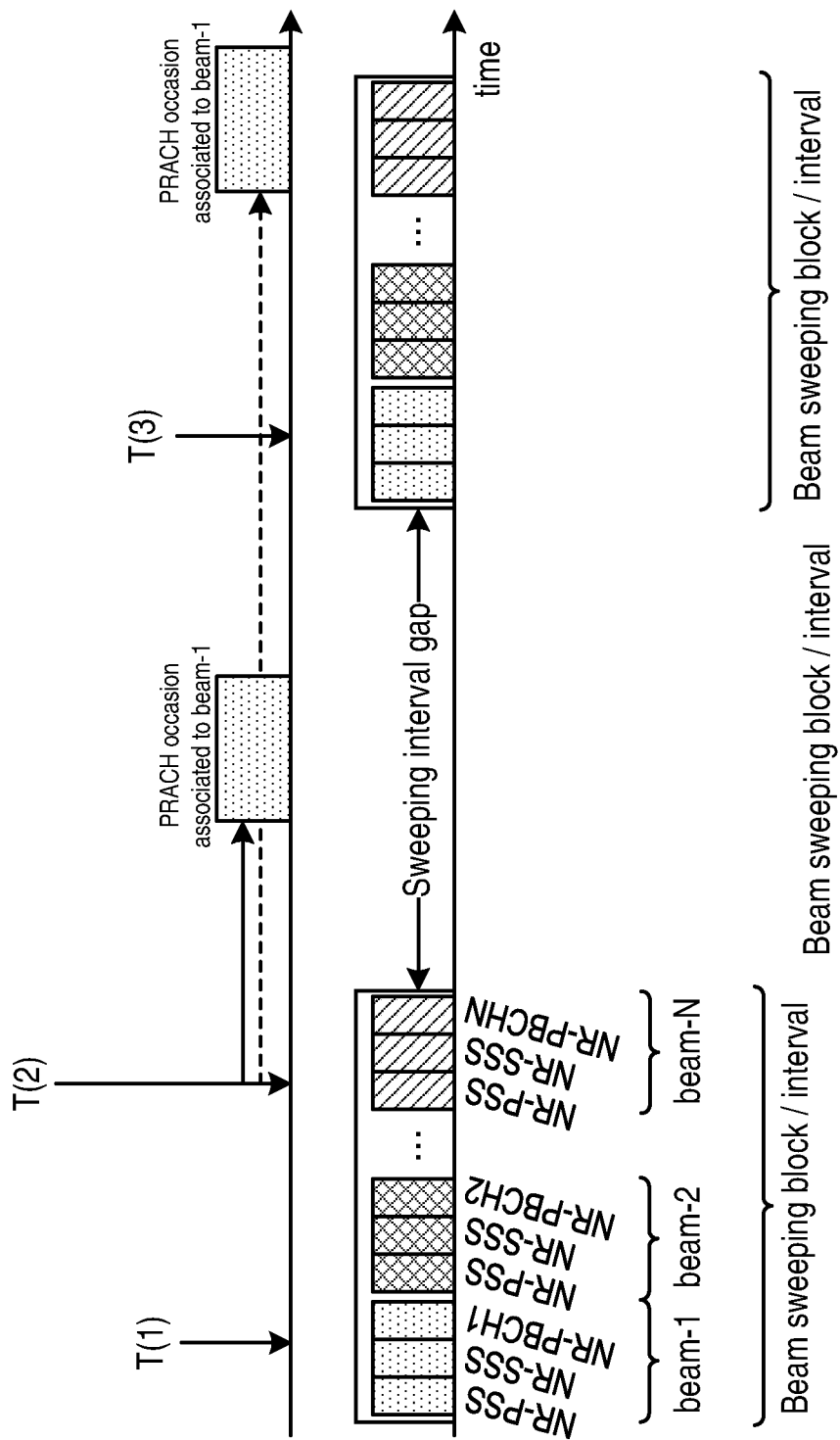
FIG. 4 shows the problem of a wireless terminal device accessing reference signals while in a low-power state, where reference signals are beamswept with an interval between beamsweeping cycles.

FIG. 4 shows a further example, in which the radio access node is configured with a time interval between each beam-sweeping cycle. Transmission opportunities associated with the UE are shown in the upper line; transmissions by the radio access node are shown in the lower line. Thus, when a UE in a low-power state needs to transmit UL data to the network, it may need to wait a long time until the next transmission of reference signals associated with its previously selected beam (beam 1 in this example). Similar to FIGS. 2 and 3, at time T(1) the UE detects reference signals and selects the strongest beam (in this example beam 1). At time T(2), while in a low-power state and before the next occurrence of beam 1, the UE determines that it has data in its buffer to transmit to the network. FIG. 4 also shows the transmission resources scheduled for a random-access channel associated with beam 1. The next occurrence of beam 1 is not until time T(3), when the UE is able to perform further measurements, and then ultimately use the transmission opportunity after that. Note that, as explained previously, the same transmission resources (or other access configurations) may be used for multiple beams within the same cell.

Thus embodiments of the disclosure are concerned with solving the problem of latency when accessing the network. Despite the fact that the problem is more acute in configurations relying on beam sweeping (as shown in FIGS. 2 to 4), the problem may exist for any UE that is in a low-power state (such as RRC idle or inactive). In such a state, whether on a cell-wide basis or beam-specific basis, reference signals may be transmitted by a radio access node sparsely. In the beam sweeping case, even if there is no time gap between sweeping blocks, the UE still needs to wait for subsequent occurrence of the same beam it is camping on. In another scenario, without beam sweeping, but with signals transmitted sparsely in time, there will be a similar problem.

According to embodiments of the disclosure, a UE in a low-power state and/or a DRX sleep state, but with uplink data to transmit in its buffer, performs what is defined herein as "opportunistic access" in a given cell or beam it has previously been camping on. That opportunistic access is based on previously acquired access configuration e.g. acquired during the last RX on period.

The access configuration may comprise one or more of: Physical Random Access Chanel (PRACH) configuration such as preamble, power settings (including e.g. power ramping up), etc; synchronization information; public land mobile network (PLMN) information, etc. The term PRACH configuration may also be used instead of access configuration. In general, access configurations comprises the information needed by the UE to access the network via the given cell or beam.

On the network side, a given radio access network node may take advantage of multiple opportunistic accesses by a given UE to transmit only a single access request response and so save resources.

One advantage of such an embodiment is that the UE does not need to wait until the next occasion of the signal supporting idle mode operation (e.g. synchronization signals such as PSS/SSS and/or cell-specific reference signals and/or beam-specific reference signals). Because of that, the control plane latency, i.e. the time it takes from when UL data arrives in the buffer to the time the packet is transmitted, can be reduced in scenarios where these signals supporting idle or inactive (i.e. the "new state" in 5G networks) mode operation are detected sparsely in time e.g. due to beam sweeping and/or network energy efficiency features (DTX at the network side). This in turn enables the network to fully utilize energy efficiency and reduced interference gains from utilizing sparse signals.

Figure 5:
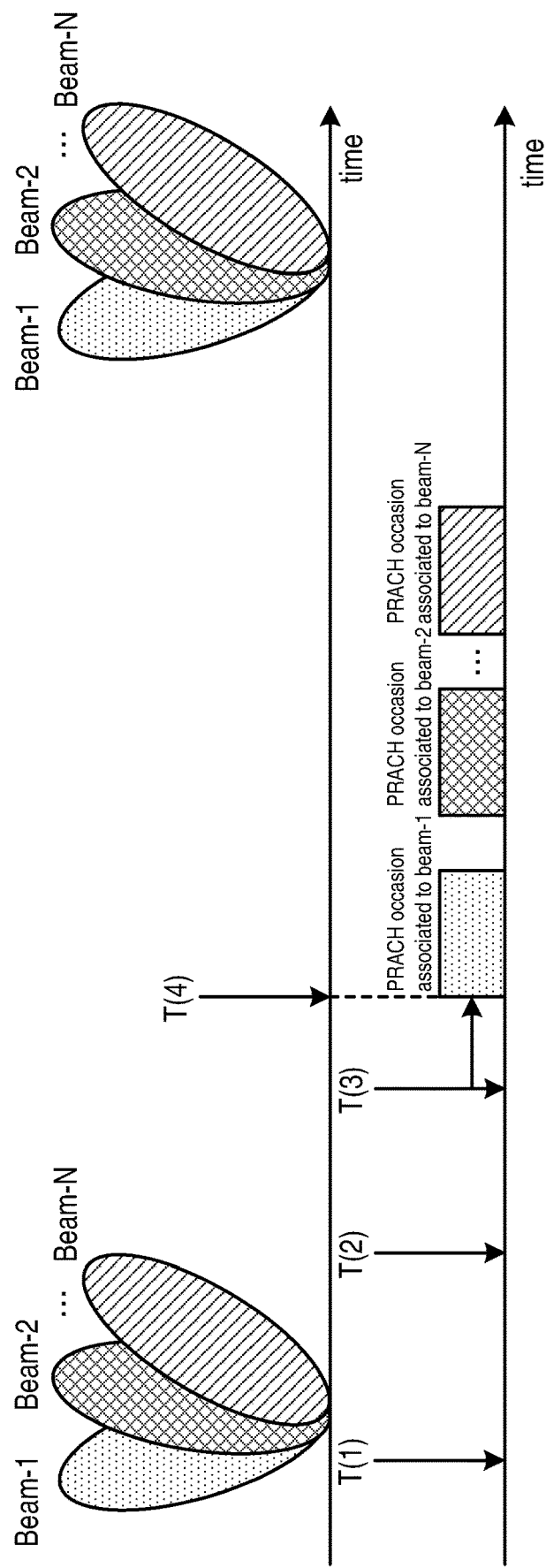
FIG. 5 shows a method according to embodiments of the disclosure.

FIG. 5 shows a method according to embodiments of the disclosure. Although described in the context of a beam-sweeping scenario (e.g. as shown in FIGS. 2 to 4), it will be apparent from the discussion above that embodiments of the disclosure are also applicable to scenarios in which each radio access node transmits reference signals for its entire cell.

Thus in step 1, at time T(1), the UE detects one or more reference signals transmitted by one or more radio access nodes. In the illustrated example, a plurality of N beams are transmitted by a single radio access node. However, the UE may detect cell-wide reference signals from one or more, or all, of the radio access nodes in its vicinity. Similarly, the UE may detect reference signals for only one or more of a plurality of beams in its vicinity (whether from the same cell or from different cells). The detection of reference signals may take place as part of a cell (or beam) selection or reselection process.

The reference signals may comprise one or more of: synchronization signals, broadcast system information, cell-specific reference signals, and beam-specific reference signals.

The UE performs measurements on the detected reference signals and ranks the beams or cells according to at least one metric for each of the detected reference signals. The at least one metric may comprise one or more of: received signal received power (RSRP); received signal received quality (RSRQ); signal to noise ratio; signal to noise and interference ratio.

The UE selects the beam or cell associated with the strongest reference signal (i.e. the highest values of the metrics), and acquires an access configuration for at least that beam or cell. The UE may also acquire an access configuration for one or more further beams or cells for which reference signals were detected. For example, access configurations may be acquired for all of the beams or cells for which reference signals were detected, or for a predetermined number of those beams or cells for which reference signals were detected. The access configuration may be transmitted as part of the reference signals received by the UE (and thus the UE acquires the access configuration(s) from the reference signals themselves), or the access configurations may be preconfigured in the UE via reference signals received at an earlier time.

The access configuration may comprise one or more of: Physical Random Access Chanel (PRACH) configuration such as preamble, power settings (including e.g. power ramping up), etc; synchronization information; public land mobile network (PLMN) information, etc. In general, access configurations comprise the information needed by the UE to access the network via the given cell or beam.

Having selected the strongest beam (which in the illustrated example is beam 1), the UE can access the network by communicating with the radio access node via that beam. However, at some later time T(2), the UE enters a low-power state in which signaling with the network is reduced in order to save power. Examples of such states include RRC_idle and RRC_inactive. The UE may also enter a discontinuous reception (DRX) sleep state in order to further conserve power. In such a state, the UE may receive reference signals only intermittently. However, according to embodiments of the disclosure, the UE keeps its previously acquired access configuration(s). That is, the access configuration for at least beam 1, and potentially other access configurations associated with the other beams/cells for which reference signals were detected, is stored in memory that is local to the UE while the UE is in the low-power state.

At time T(3), while in the low-power state, the UE determines that it has data in its buffer to transmit to the network (i.e. in uplink). According to embodiments of the disclosure, the UE assumes that it is still within the coverage area of beam 1 (i.e. the beam/cell on which the UE was previously camped when entering the low-power state), and utilizes the access configuration previously acquired for beam 1 to transmit an access request to the network (e.g. a PRACH preamble).

In the illustrated example, the access configuration for beam 1 comprises a set of physical resources (i.e. one or more time slots and/or frequency bands) with which the UE is to transmit on the random-access channel associated with beam 1. Thus, when the time slots scheduled for PRACH associated with beam 1 occur at time T(4), the UE transmits an access request (e.g. a PRACH preamble) to the radio access node via beam 1.

If the UE remains within the coverage of beam 1, the access request should be received and the radio access node can respond by transmitting a response message (e.g. a random-access response, RAR, message). However, further detail regarding this can be found below with regard to FIG. 7. Further transmissions may follow between the radio access node and the UE, as will be understood by those skilled in the art, in order to transmit whatever UL data is in the UE's buffer to the radio access node. Thus, by access the network opportunistically, without waiting to detect further reference signals in the vicinity of the UE, or performing measurements to detect cells and/or beams in the vicinity of the UE, the UE can access the network with far lower latency than would otherwise be the case.

Of course, the UE may have moved out of the coverage area of beam 1 since entering the low-power state and/or the DRX sleep state, in which case the access request message may not be received by the radio access node, and no response message will be received from the radio access node. In these circumstances, the UE may utilize one or more access configurations associated with other beams/cells for which reference signals were detected in step 1, in order to transmit access request messages for those respective beams/cells. For example, the UE may utilize an access configuration associated with the beam/cell for which the reference signal was second strongest (i.e. as determined according to the at least one metric), to transmit an access request message for that beam/cell. If no response is received for that access request message, the UE may continue transmitting access request messages for the beams/cells detected in step 1, in the order of strongest reference signal to weakest reference signal, utilizing the stored access configurations. Further detail regarding this aspect is provided below with respect to FIG. 6.

Figure 6:
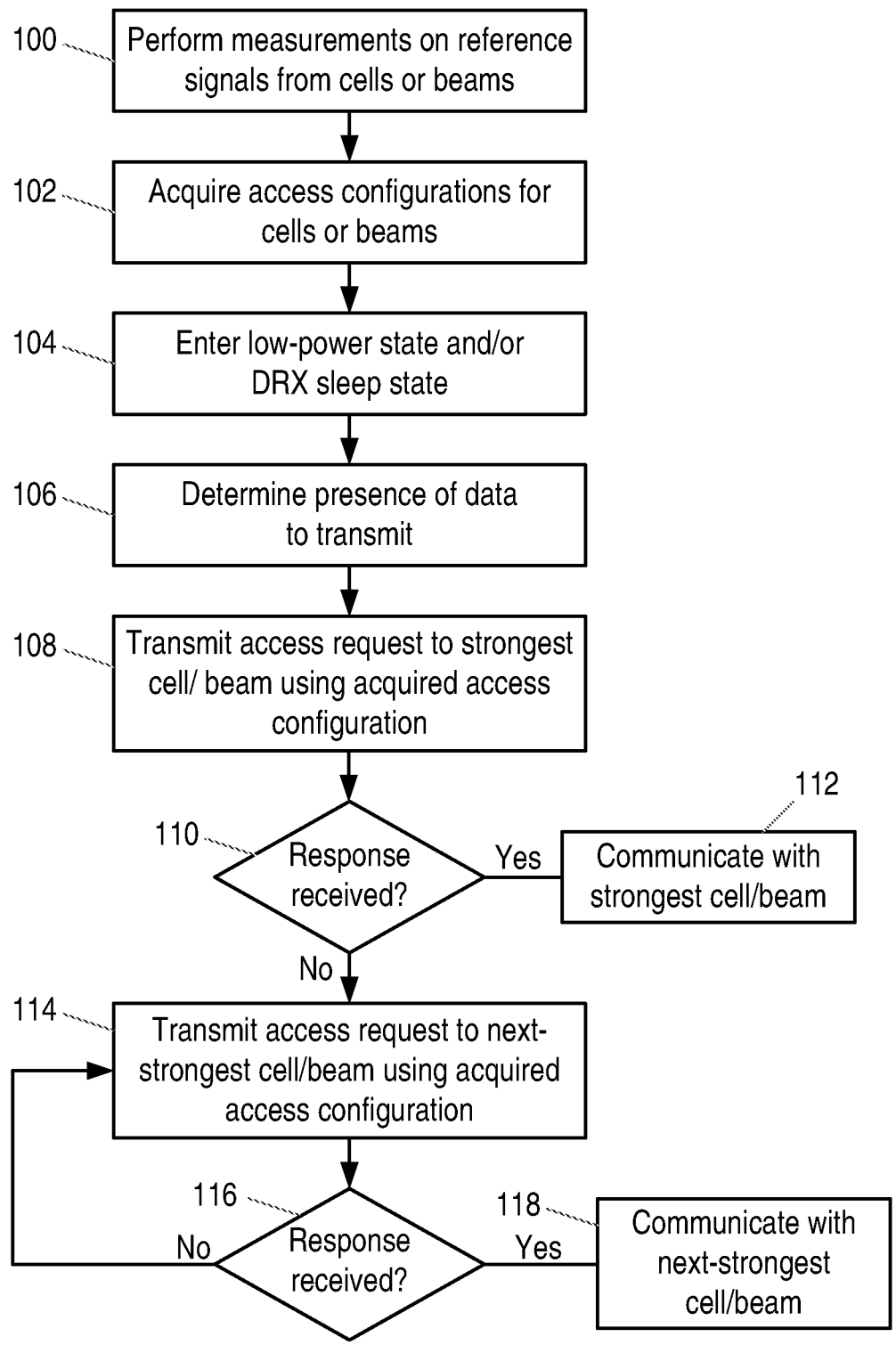
FIG. 6 is a flowchart of a method in a wireless terminal device according to embodiments of the disclosure.

FIG. 6 is a flowchart of a method in a wireless terminal device (e.g. a UE), according to embodiments of the disclosure.

The method begins in step 100, in which the UE performs measurements on reference signals transmitted by radio access nodes within its vicinity. The reference signals may support UEs operating in low-power states within the coverage areas of the radio access nodes (i.e. by ensuring synchronicity with the network, and broadcasting information regarding the identity of radio access nodes and). The reference signals may comprise one or more of: synchronization signals, broadcast system information, cell-specific reference signals, and beam-specific reference signals.

Each of the reference signals may be associated with an entire cell, or a subset of one or more beams within a particular cell. Further, reference signals may be received from one or multiple radio access nodes. The detection of reference signals may take place as part of a cell (or beam) selection or reselection process.

The UE performs measurements on the detected reference signals and ranks the beams or cells according to at least one metric for each of the detected reference signals. The at least one metric may comprise one or more of: received signal received power (RSRP); received signal received quality (RSRQ); signal to noise ratio; signal to noise and interference ratio.

In step 102, the UE acquires access configurations for one or more beams or cells for which reference signals were detected, and stores those access configurations in memory that is local to the UE. For example, access configurations may be acquired for all of the beams or cells for which reference signals were detected, or for only a predetermined number of the cells/beams for which the strongest reference signals were detected. The access configuration may be transmitted as part of the reference signals received by the UE (and thus the UE acquires the access configuration(s) from the reference signals themselves), or the access configurations may be preconfigured in the UE via reference signals received at an earlier time.

The access configuration may comprise one or more of: Physical Random Access Chanel (PRACH) configuration such as preamble, power settings (including e.g. power ramping up), etc; synchronization information; public land mobile network (PLMN) information, etc. In general, access configurations comprise the information needed by the UE to access the network via the given cell or beam.

In step 104, the UE enters a low-power state and/or a discontinuous reception (DRX) sleep state. For example, the UE may enter such a state due to prolonged inactivity (i.e. no data being transmitted or received by the UE for a threshold period of time). The low-power state may be an idle state, inactive state or any other state, sub-state or configuration optimized for lower signaling overhead and lower power/energy consumption. Examples of such a low-power state include RRC_idle and RRC_inactive.

In step 106, while in the low-power state or the DRX sleep state, the UE determines the presence of data to transmit to the network. For example, there may be data present in the buffer of the UE (e.g. because of some use of the UE by a user) to transmit to the radio access node in UL.

In step 108, responsive to the determination that there is data to transmit to the network, the UE transmits an access request message to the cell or subset of beams associated with the strongest reference signal received in step 100, using the access configuration for that cell or subset of beams acquired in step 102. This may be the cell or subset of beams on which the UE was camped at the time of entering the low-power state or DRX sleep state. For example, the access request message may comprise a random-access preamble, or some other access request message transmitted using resources defined in the access configuration for the cell or subset of beams. The access configurations previously acquired by the UE are re-used.

Note that the access request message is transmitted in step 108 without waiting to receive further reference signals or performing measurements to detect the presence of further reference signals. The UE therefore transmits the access request message at the earliest opportunity once it determines that there is data to transmit. In scenarios where reference signals are transmitted sparsely, whether through beamsweeping configurations (with and without an interval between beamsweeping cycles) or cell-wide transmission of reference signals, the latency associated with waiting for subsequent reference signals is avoided.

The decision to transmit the access-request message opportunistically may be taken based on one or more rules configured by the network. See FIG. 7 and step 200 for more details. The UE may determine, for example, whether its mobility is below a particular threshold (i.e. whether the UE is moving slowly or stationary), or whether the data in its buffer is associated with a high-priority task that requires low latency. The UE may also determine whether it is in a coverage area with wide beams or narrow beams, or whether it has been configured with DRX cycles that are longer than a threshold length. Alternatively, the UE may be configured to use opportunistic access in all circumstances, such that step 108 occurs regardless of the situation of the UE.

Steps 110 onwards describe the process following transmission of an access request. In step 110, the UE listens for a response message, transmitted by the radio access node in response to its access request message transmitted in step 108. For example, the UE may activate one or more timers upon transmission of the access request message in step 108.

A first timer may be utilized by the UE to define a time window following transmission of the access request in which the UE should continue to listen for a response. If a response is received within the time window (i.e. while the first timer is still active), the method proceeds to step 112, where further communication can take place between the UE and the cell/beam associated with the strongest reference signal measured in step 100 in order to transmit the UL data discovered in step 106. For example, the further signaling may establish, re-establish or resume an RRC connection between the UE and the radio access node. Such communication can be largely conventional in nature, and is not described in detail further herein. However, in one embodiment, the further signaling may comprise an indication from the UE that the access request message was an opportunistic access to help the network to solve potential conflicts at the network.

If the first timer expires without receipt of a response message, the UE can stop listening for a response message from the cell/beams associated with the strongest reference signal, e.g. stop listening on the physical resources defined for response messages (whether those resources are dedicated to the particular cell/beams in question or are common to multiple cells/beams. The UE may have moved out of the coverage area of the cell/beams since entering the low-power state or the DRX sleep state. In one embodiment, upon expiry of the first timer, the UE can continue to step 114, in which a second access request message is transmitted to the cell/beams associated with the second-strongest reference signals measured in step 100, using the access configuration for that cell/beams acquired in step 102.

However, in other embodiments, the UE may activate a second timer upon transmission of the first access request message in step 108. The second timer may have a value that is smaller than the first timer, such that it expires before the first timer. The UE may proceed to step 114 and transmit a second access request message to the cell/beams associated with the second-strongest reference signals upon expiry of the second timer, i.e. while continuing to listen for a response to the first access request message from the cell/beams associated with the strongest reference signals. In this way, the UE can handle multiple access request processes concurrently and so reduce latency if the UE is no longer in the coverage area of the cell/beam associated with supposedly strongest reference signals. In further embodiments, multiple timers may be activated and running concurrently, so that more than two access request processes are active concurrently (i.e. the UE transmits an access request message while simultaneously monitoring for responses from two or more previously transmitted access request messages).

In step 116, the UE monitors for a response from the second access request message (e.g. within a time window defined by a timer started upon transmission of the second access request message). If a response is received, the process moves to step 118, in which further communication can take place between the UE and the cell/beam associated with the second-strongest reference signal measured in step 100 in order to transmit the UL data discovered in step 106. Such communication can be largely conventional in nature, and is not described further herein.

If no response is received, the method moves back to step 114, and a third access request message is transmitted to the cell/beam associated with the third-strongest reference signals measured in step 100, using the access configuration acquired in step 102.

This process may be repeated until a response message is received to one of the access request messages, or access request messages have been transmitted for all of the cell/beams for which reference signals were detected in step 100, or access request messages have been transmitted for a predetermined number of those cells/beams (i.e. the cells/beams associated with the strongest reference signals) configured by the network, or until further reference signals are received and a new set of measurements is taken on those reference signals to identify the cells and/or beams in the vicinity of the UE. For example, when a timer expires without reception of a response message to a transmitted access request message, for a predefined period of time afterwards the UE may listen for further reference signals relating to the cell/beam for which the access request message was transmitted, or any other cell/beam in the vicinity.

Note that, although the method above describes a process in which access request messages are transmitted for beams/cells associated with successively weaker reference signals, alternative rules may be defined for the order in which the access request messages are transmitted. For example, if different reference signals are received from subsets of beams associated with the same cell, the UE may be configured to transmit access-request messages for all beams within a particular cell (e.g. the cell having the beam(s) from which the strongest reference signal was received) before transmitting access request messages for other beams/cells. Alternatively, the first access request message (i.e. the message transmitted in step 108) may be transmitted to the cell/beams on which the UE was previously camped immediately prior to entering the low-power state, regardless of whether or not the reference signal associated with that cell or beams was the strongest. In a further alternative, the UE may be configured to transmit access request messages only via beams associated with the cell on which the UE was previously camped, and/or may transmit access request messages to other cells only if the reference signals associated with those other cells (or associated with beams of other cells) are stronger than reference signals received from the serving cell or beams.

In one embodiment, the UE may be able to transmit multiple access-request messages simultaneously (i.e. for different beams of a particular cell). For example, where multiple beams are associated with the same random-access channel resources, but different preamble sets, the UE can transmit preambles for each of the multiple beams simultaneously (i.e. using the same random-access channel resources), subject to any limitation of the UE's available transmit power. This may prompt the network to respond to each of the access-request messages, or at least the access-request messages that it receives, and thus the UE may receive one or more response messages relating to corresponding beams. Because the different preambles belong to preamble sets associated with different beams, the responses will be transmitted in different beams, and may have different metrics (e.g. signal strength, received signal received power, signal-to-noise ratio, signal-to-noise-and-interference ratio etc). The UE may then select the beam associated with the highest metric for further communication.

Thus, by utilizing the method defined above with respect to FIGS. 5 and 6, a wireless terminal device is able to substantially reduce latency when accessing the network from a low-power state or a DRX sleep state.

Figure 7:
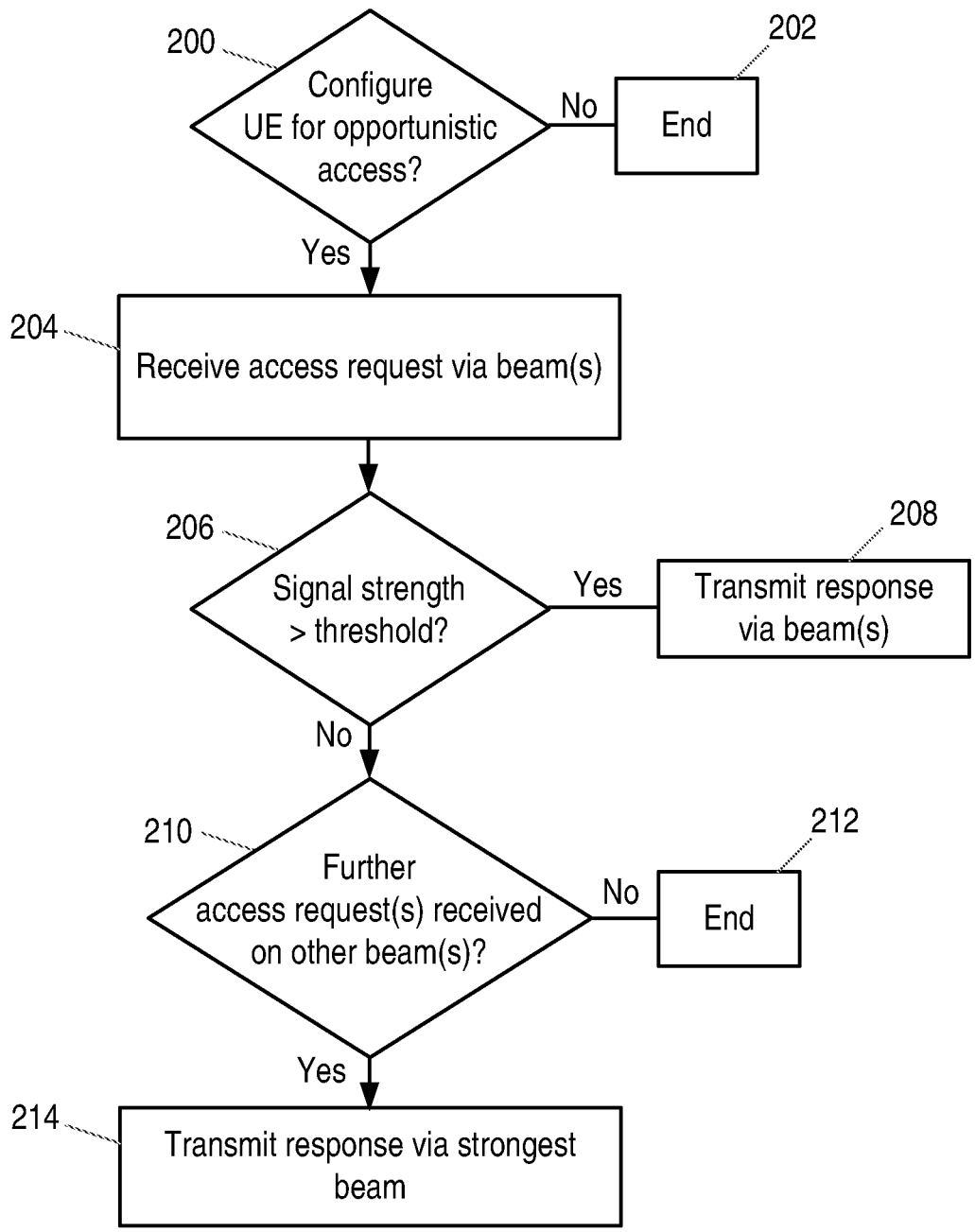
FIG. 7 is a flowchart of a method in a network node according to embodiments of the disclosure.

FIG. 7 is a flowchart of a method in a network node according to embodiments of the disclosure. For example, the network node may be a radio access node (e.g. a radio access node transmitting cell-wide reference signals or a radio access node transmitting beam-specific reference signals), or a network node communicatively coupled to such a radio access node and able to receive data from the radio access node and instruct the radio access node to carry out operations. For example, in the latter case, the network node may be embodied in a server that is remote from the radio access node's location (e.g. in the cloud, or the core network).

In step 200, the network node determines whether to configure a particular wireless terminal device (e.g. a UE) for opportunistic access as defined above. That is, the network node determines whether to allow (and/or instruct) the UE to transmit access requests based on previously acquired access configurations, without waiting to receive further reference signals, while in a low-power state. The configuration as to whether to use opportunistic access may be specific to each UE (i.e. defined for each individual UE via dedicated signaling), or specific to multiple UEs (or all UEs). For example, UEs may be configured with a set of rules by which they may determine themselves whether or not to use opportunistic access.

Opportunistic access may be configured by the network in cases where the likelihood of a UE remaining in the same beam and/or cell is high and/or in cases where there may be a significant time interval between transmissions of the same reference signals in the same direction. In other words, opportunistic access may be configured for a UE when there is a high likelihood that, X seconds after the UE has detected a beam and acquired the access configuration, the UE remains under the coverage of that beam and/or cell (where X may be defined according to the needs of the network).

For example, opportunistic access may be configured for UEs that are stationary and/or moving with low speed. The network node may define a threshold speed or mobility below which the UE should use opportunistic access. Opportunistic access may be configured for areas of coverage in which relatively wide beams are used to transmit reference signals (as it is less likely that the UE will have moved out of coverage of a particular beam).

The expected urgency of the UE's access may also be taken into account, e.g. such that the configuration is UE specific (e.g. provided via dedicated signaling when the UE is in connected/active mode) and a UE, which is expected to have an urgent need to transmit UL data, when the UL data arrives in the transmission buffer, could be configured to use opportunistic access, while other UEs are not. This consideration may be based on, e.g., the QoS associated with the UE's traffic (e.g. flows or bearers), the category or capabilities of the UE and/or subscription data. Alternatively, the UE itself may determine the level of urgency associated with the data in its transmission buffer and whether or not opportunistic access should be used.

The method may be configured for UEs which are configured with short DRX cycles. The reason is that there may not be many which are both UEs configured with very long DRX cycles and at the same time concerned with control plane latency. So the network node may decide not to configure UEs configured with long DRX cycles for opportunistic access.

The network may also select geographical areas where the feature is allowed to be used e.g. low-speed areas with longer periodicity between signals supporting idle/inactive mode operation.

Any and all of these parameters may be taken into account, either on their own or in combination, to determine whether to configure a UE for opportunistic access (or to define the parameters by which the UE should configure itself for opportunistic access). If the UE is not configured for opportunistic access, the method ends at step 202.

If the UE is configured for opportunistic access, the method proceeds to step 204, in which an access request message is received from the UE at a radio access node. The access request message may be received via a particular cell associated with the radio access node, or via a subset of one or more beams of that cell, and may relate to a random-access channel associated with that cell or subset of beams. The origin of the access request message may be determined, for example, based on the preamble that is used in the message.

In step 206, measurements are performed on the received access request message, and at least one metric of the access request message is determined. For example, the metric may comprise one or more of: received signal strength, received signal received power, received signal received quality, signal-to-noise ratio, signal-to-noise-and-interference ratio. If the metric is above a threshold (i.e. the message is sufficiently strong), the method proceeds to step 208, and the transmission of a response message by the radio access node is initiated. If the access request is received via one or more beams, the response message may be transmitted via those one or more beams. Such a response message may prompt further communication between the UE and the radio access node, e.g. such that data can be transmitted from the UE to the radio access node.

In one embodiment of the disclosure, the method ends at that point. That is, the network node receives access requests from UEs, and responds to all of those access requests that are received with adequate quality or signal strength. If an access request does not have adequate quality or signal strength (i.e. the metric is below the threshold), no response is transmitted.

However, in other embodiments of the disclosure, the network node may take advantage of the opportunistic access used by UEs. For example, in the illustrated embodiment, if the access request message is received via one or more beams of a radio access node, the method may proceed to step 210 in which the network node monitors for the receipt of further access request messages via other beams associated with the radio access node. For example, the network node may monitor for further access request messages in a time window immediately following receipt of the first access request message in step 204. If no further access request messages are received by the radio access node, the method ends in step 212. However, if one or more further access request messages are received within that time window, the network node may assume that the access request messages are the result of opportunistic accesses by a single UE following the method set out in FIG. 6 (i.e. transmitting multiple access request messages sequentially). In step 214, the network node may determine the access request message having the highest metric of those messages received in steps 204 and 210, and initiate transmission of a response message only to that access request message (i.e. using the beam(s) for which the access request was received). In this way, resources in the radio access node can be saved.

If one or more of the access request messages was from a second UE, which did not receive any response, the second UE should transmit one or more further access requests when it fails to detect any response from the network. Those further access request messages can be handled and responded to in the normal way.

Further, the signaling subsequent to transmission of a response message may be used to resolve such potential conflicts. For example, such signaling from the UE may contain an indication that the first access request message (and potentially other messages transmitted by the UE) was an opportunistic access. The network node may thus determine that access request messages that are not contained within this indication were transmitted by different UEs, and initiate transmission of response messages to those access request messages.

Thus embodiments of the disclosure provide methods for opportunistically accessing the network, without waiting to receive or perform measurements on further reference signals received from the network once the UE determines that it has data to transmit. Thus can substantially reduce the latency of communications between UEs in a low-power state and the network.

Figure 8:
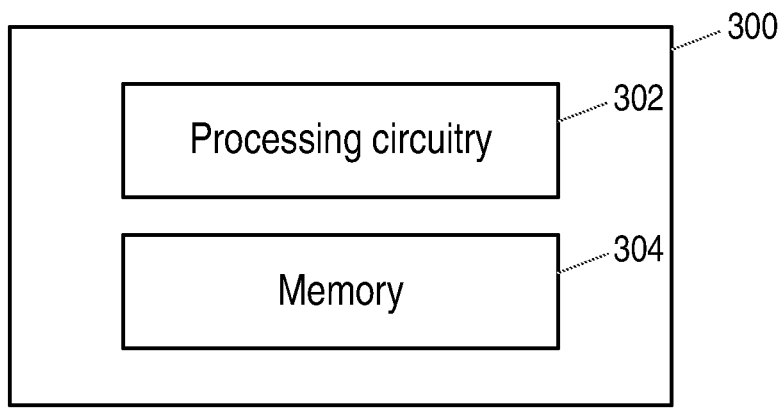
FIG. 8 is a schematic diagram of a wireless terminal device according to embodiments of the disclosure.

FIG. 8 is a schematic drawing of a wireless terminal device 300 according to embodiments of the disclosure. The wireless terminal device 300 is operable in a plurality of states, comprising a first state and a second state, wherein the second state requires less signalling overhead with the telecommunications network than the first state. The wireless terminal device 300 comprises processing circuitry 302 and a non-transitory computer-readable medium 304 storing instructions which, when executed by the processing circuitry, cause the wireless terminal device to: perform measurements on one or more reference signals transmitted by a cell of the telecommunications network, or a set of one or more beams of a cell of the telecommunications network; based on the measurements, acquire an access configuration for accessing the cell of the telecommunications network, or for accessing the set of one or more beams of a cell of the telecommunications network; while in the second state, determine the presence of data to transmit to the telecommunications network; and, responsive to determining the presence of data to transmit, utilize the acquired access configuration to transmit an access request to the cell or the set of one or more beams without performing further measurements on further reference signals from the cell or the set of one or more beams.

The wireless terminal device 300 may further comprise one or more antennas and corresponding transceiver circuitry (not illustrated) for transmitting wireless signals to, and receiving wireless signals from, a radio access node of the telecommunications network.

Figure 9:
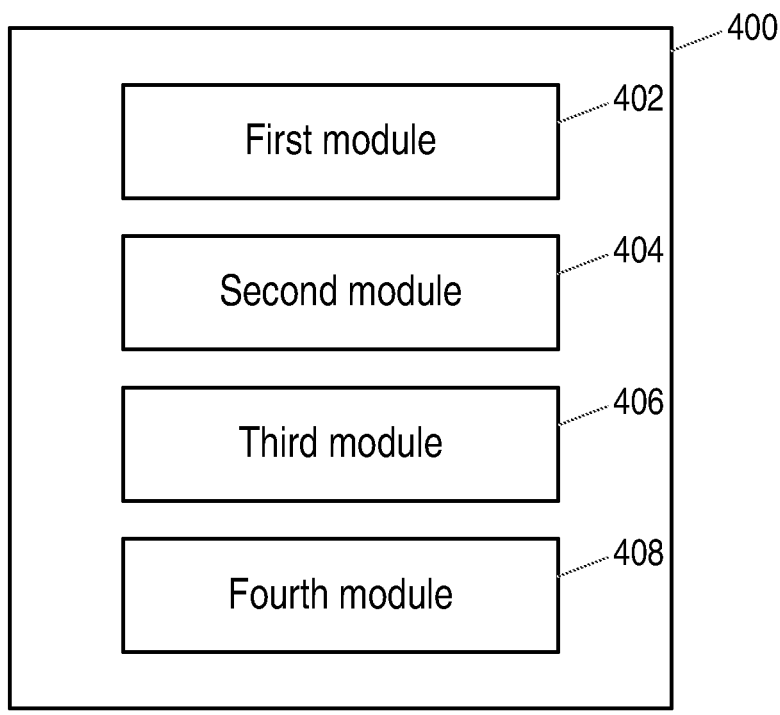
FIG. 9 is a schematic diagram of a wireless terminal device according to further embodiments of the disclosure.

FIG. 9 is a schematic diagram of a wireless terminal device 400 according to further embodiments of the disclosure. The wireless terminal device 400 is operable in a plurality of states, comprising a first state and a second state, wherein the second state requires less signalling overhead with the telecommunications network than the first state. The wireless terminal device 400 comprises: a first module 402 configured to perform measurements on one or more reference signals transmitted by a cell of the telecommunications network, or a set of one or more beams of a cell of the telecommunications network; a second module 404 configured to, based on the measurements, acquire an access configuration for accessing the cell of the telecommunications network, or for accessing the set of one or more beams of a cell of the telecommunications network; a third module 406 configured to, while the wireless terminal device 400 is in the second state, determine the presence of data to transmit to the telecommunications network; and a fourth module 408 configured to, responsive to determining the presence of data to transmit, utilize the acquired access configuration to transmit an access request to the cell or the set of one or more beams without performing further measurements on further reference signals from the cell or the set of one or more beams.

The wireless terminal device 400 may further comprise one or more antennas and a corresponding transceiver module (not illustrated) for transmitting wireless signals to, and receiving wireless signals from, a radio access node of the telecommunications network.

Figure 10:
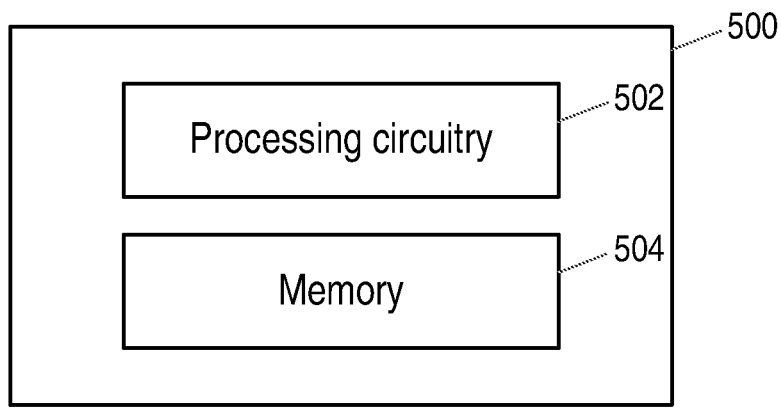
FIG. 10 is a schematic diagram of a network node according to embodiments of the disclosure.

FIG. 10 is a schematic diagram of a network node 500 according to embodiments of the disclosure. For example, the network node 500 may be a radio access node (such as an eNodeB or a gNodeB), or a node connected to the core network or within a server environment and communicatively coupled to such a radio access node.

The node 500 may be for use in a telecommunications network, comprising a wireless terminal device being operable in a plurality of states, the plurality of states comprising a first state and a second state, wherein the second state requires less signalling overhead with the telecommunications network than the first state. The wireless terminal device may be further configured to acquire and store an access configuration for accessing a cell of the telecommunications network, or for accessing a set of one or more beams of a cell of the telecommunications network. The network node 500 comprises processing circuitry 502 and a non-transitory computer-readable medium 504 storing instructions which, when executed by the processing circuitry 502, cause the node 500 to configure the wireless terminal device to, responsive to determining the presence of data to transmit to the telecommunications network while in the second state, utilize the acquired access configuration to transmit an access request to the cell or the set of one or more beams without performing further measurements on further reference signals from the cell or the set of one or more beams.

Figure 11:
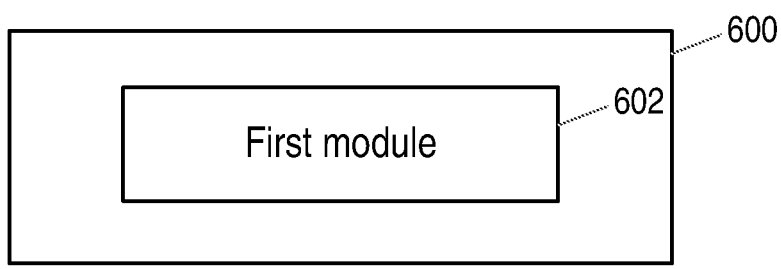
FIG. 11 is a schematic diagram of a network node according to further embodiments of the disclosure.

FIG. 11 is a schematic diagram of a network node 600 according to further embodiments of the disclosure. For example, the network node 600 may be a radio access node (such as an eNodeB or a gNodeB), or a node connected to the core network or within a server environment and communicatively coupled to such a radio access node.

The node 600 may be configured for use in a telecommunications network, comprising a wireless terminal device being operable in a plurality of states, the plurality of states comprising a first state and a second state, wherein the second state requires less signalling overhead with the telecommunications network than the first state. The wireless terminal device may be further configured to acquire and store an access configuration for accessing a cell of the telecommunications network, or for accessing a set of one or more beams of a cell of the telecommunications network. The node comprising a first module 602 configured to configure the wireless terminal device to, responsive to determining the presence of data to transmit to the telecommunications network while in the second state, utilize the acquired access configuration to transmit an access request to the cell or the set of one or more beams without performing further measurements on further reference signals from the cell or the set of one or more beams.

Although the text above has described embodiments of the disclosure in the context of the 3GPP specifications, specifically Long Term Evolution and developments thereto, those skilled in the art will appreciate that the methods, apparatus and concepts described herein may equally apply to other radio access technologies and the networks that employ them.

The invention claimed is:

1. A method in a wireless terminal device for use with a telecommunications network, the wireless terminal device being operable in a plurality of states, the plurality of states comprising a first state and a second state, wherein the second state requires less signaling overhead with the telecommunications network than the first state, the method comprising:
performing measurements on one or more reference signals transmitted by a cell of the telecommunications network, or a set of one or more beams of a cell of the telecommunications network;
based on the measurements, acquiring an access configuration for accessing the cell of the telecommunications network, or for accessing the set of one or more beams of a cell of the telecommunications network;
while in the second state, determining the presence of data to transmit to the telecommunications network; and
responsive to determining the presence of data to transmit, utilizing the acquired access configuration to transmit an access request to the cell or the set of one or more beams without performing further measurements on further reference signals from the cell or the set of one or more beams.

2. The method of claim 1, wherein the wireless terminal device determines the presence of data to transmit to the telecommunications network while in the second state and a discontinuous reception (DRX) sleep state.

3. The method of claim 2, wherein the first state is a radio resource control (RRC) connected state and the second state is an RRC inactive state or an RRC idle state.

4. The method of claim 1, wherein the access configuration comprises one or more of:
a configuration of a random access channel for the respective cell or for the respective set of one or more beams; and
power settings for accessing the respective cell or the respective set of one or more beams.

5. The method of claim 1, wherein the step of performing measurements comprises:
performing measurements on one or more reference signals transmitted by one or more of:
a plurality of cells of the telecommunications network, and
a plurality of sets of one or more beams of one or more cells of the telecommunications network,
and wherein the step of acquiring an access configuration comprises acquiring respective access configurations for accessing multiple cells of the telecommunications network, or for accessing multiple sets of one or more beams of one or more cells of the telecommunications network.

6. The method of claim 5, wherein the step of utilizing the acquired access configuration comprises utilizing the access configuration for a first cell or a first set of one or more beams, to transmit an access request to the first cell or the first set of one or more beams.

7. The method of claim 6, wherein utilizing the acquired access configuration comprises utilizing the access configuration for more than one set of one or more beams of a cell, to transmit simultaneous access requests for each of the more than one set of one or more beams.

8. A method in a node for use in a telecommunications network, the telecommunications network comprising a wireless terminal device being operable in a plurality of states, the plurality of states comprising a first state and a second state, wherein the second state requires less signaling overhead with the telecommunications network than the first state, the wireless terminal device further acquiring and storing an access configuration for accessing a cell of the telecommunications network, or for accessing a set of one or more beams of a cell of the telecommunications network, the method comprising:
configuring the wireless terminal device to, responsive to determining the presence of data to transmit to the telecommunications network while in the second state, utilize the acquired access configuration to transmit an access request to the cell or the set of one or more beams without performing further measurements on further reference signals from the cell or the set of one or more beams.

9. The method of claim 8, further comprising determining that the wireless terminal device has low mobility or is stationary and, responsive to the determination that the wireless terminal device has low mobility or is stationary, configuring the wireless terminal device to, responsive to determining the presence of data to transmit to the telecommunications network, utilize the acquired access configuration to transmit an access request to the cell or the set of one or more beams without receiving or utilizing information contained within further reference signals from the telecommunications network.

10. The method of claim 9, further comprising determining that traffic associated with the wireless terminal device requires low latency and, responsive to the determination that traffic associated with the wireless terminal device requires low latency, configuring the wireless terminal device to, responsive to determining the presence of data to transmit to the telecommunications network, utilize the acquired access configuration to transmit an access request to the cell or the set of one or more beams without receiving or utilizing information contained within further reference signals from the telecommunications network.

11. The method of claim 8, further comprising determining that the wireless terminal device is configured with discontinuous reception cycles having a length that is less than or equal to a threshold, and, responsive to the determination that the wireless terminal device is configured with discontinuous reception cycles having a length that is less than or equal to a threshold, configuring the wireless terminal device to, responsive to determining the presence of data to transmit to the telecommunications network, utilize the acquired access configuration to transmit an access request to the cell or the set of one or more beams without receiving or utilizing information contained within further reference signals from the telecommunications network.

12. The method of claim 8, further comprising:
responsive to receipt of an access request via the cell or the set of one or more beams, initiating transmission of an access request response message from the cell or the set of one or more beams.

13. The method of claim 12, further comprising:
determining at least one metric associated with the received access request; and
responsive to a determination that the at least one metric has a value that is higher than or equal to a threshold, initiating transmission of an access request response message from the cell or the set of one or more beams.

14. A wireless terminal device for use with a telecommunications network, the wireless terminal device being operable in a plurality of states, the plurality of states comprising a first state and a second state, wherein the second state requires less signaling overhead with the telecommunications network than the first state, the wireless terminal device comprising:
processing circuitry,
and a non-transitory computer-readable medium, the computer-readable medium storing instructions which, when executed by the processing circuitry, cause the wireless terminal device to:
perform measurements on one or more reference signals transmitted by a cell of the telecommunications network, or a set of one or more beams of a cell of the telecommunications network;
based on the measurements, acquire an access configuration for accessing the cell of the telecommunications network, or for accessing the set of one or more beams of a cell of the telecommunications network;
while in the second state, determine the presence of data to transmit to the telecommunications network; and
responsive to determining the presence of data to transmit, utilize the acquired access configuration to transmit an access request to the cell or the set of one or more beams without performing further measurements on further reference signals from the cell or the set of one or more beams.

15. The wireless terminal device of claim 14, wherein the computer-readable medium stores instructions which, when executed by the processing circuitry, cause the wireless terminal device to:
determine the presence of data to transmit to the telecommunications network while in the second state and a discontinuous reception (DRX) sleep state.

16. The wireless terminal device of claim 15, wherein the first state is a radio resource control (RRC) connected state and the second state is an RRC inactive state or an RRC idle state.

17. The wireless terminal device of claim 14, wherein the access configuration comprises one or more of:
a configuration of a random access channel for the respective cell or for the respective set of one or more beams; and
power settings for accessing the respective cell or the respective set of one or more beams.

18. The wireless terminal device of claim 14, wherein the computer-readable medium stores instructions which, when executed by the processing circuitry, cause the wireless terminal device to:
perform measurements on one or more reference signals transmitted by a cell of the telecommunications network, or a set of one or more beams of a cell of the telecommunications network, by performing measurements on one or more reference signals transmitted by one or more of:
a plurality of cells of the telecommunications network, and
a plurality of sets of one or more beams of one or more cells of the telecommunications network, and
wherein the wireless terminal device is configured to acquire an access configuration by acquiring respective access configurations for accessing multiple cells of the telecommunications network, or for accessing multiple sets of one or more beams of one or more cells of the telecommunications network.

19. A node for use in a telecommunications network, the telecommunications network comprising a wireless terminal device being operable in a plurality of states, the plurality of states comprising a first state and a second state, wherein the second state requires less signaling overhead with the telecommunications network than the first state, the wireless terminal device further acquiring and storing an access configuration for accessing a cell of the telecommunications network, or for accessing a set of one or more beams of a cell of the telecommunications network, the node comprising:
processing circuitry, and
a non-transitory computer-readable medium storing instructions which, when executed by the processing circuitry, cause the node to:
configure the wireless terminal device to, responsive to determining the presence of data to transmit to the telecommunications network while in the second state, utilize the acquired access configuration to transmit an access request to the cell or the set of one or more beams without performing further measurements on further reference signals from the cell or the set of one or more beams.

* * * * *